United States Patent
Dupree et al.

(10) Patent No.: US 7,391,358 B2
(45) Date of Patent: Jun. 24, 2008

(54) WEATHER RADAR ECHO TOPS FORECAST GENERATION

(75) Inventors: William Dupree, Westborough, MA (US); Marilyn M. Wolfson, Acton, MA (US); Richard J. Johnson, Harvard, MA (US); Robert Boldi, Sudbury, MA (US); Paul E. Bieringer, Arlington, MA (US); Kim T. Calden, Milford, NH (US); Carol A. Wilson, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/472,674

(22) Filed: Jun. 22, 2006

(65) Prior Publication Data

US 2007/0005249 A1     Jan. 4, 2007

Related U.S. Application Data

(60) Provisional application No. 60/695,590, filed on Jun. 30, 2005.

(51) Int. Cl.
G01W 1/10 (2006.01)
G01W 1/00 (2006.01)
G01S 13/95 (2006.01)
G01S 13/00 (2006.01)

(52) U.S. Cl. ............... 342/25 R; 342/175; 342/176; 342/179; 342/195; 382/100; 702/1; 702/2; 702/3; 73/170.16

(58) Field of Classification Search ...... 342/26 R–26 D, 342/27, 28, 89–103, 175, 176, 179, 190–197; 382/100, 107, 155, 159; 702/1–3; 73/170.16
See application file for complete search history.

(56) References Cited

U.S. PATENT DOCUMENTS

| | | | | |
|---|---|---|---|---|
| 3,725,914 | A | * | 4/1973 | Davidson et al. .......... 342/26 D |
| 5,406,481 | A | * | 4/1995 | Shinozawa et al. ............. 702/3 |
| 5,583,972 | A | * | 12/1996 | Miller ...................... 342/26 D |
| 5,959,567 | A | * | 9/1999 | Wolfson et al. ........... 342/26 R |
| 5,974,360 | A | * | 10/1999 | Otsuka et al. .................. 702/3 |
| 6,128,578 | A | * | 10/2000 | Sakaino et al. ................. 702/3 |
| 6,263,089 | B1 | * | 7/2001 | Otsuka et al. ............... 382/107 |
| 6,339,747 | B1 | * | 1/2002 | Daly et al. ..................... 702/3 |
| 6,340,946 | B1 | * | 1/2002 | Wolfson et al. ........... 342/26 R |

(Continued)

FOREIGN PATENT DOCUMENTS

WO        WO98/26306 A1 *  6/1998

OTHER PUBLICATIONS

International Search Report for PCT/US2006/024424 dated Jan. 17, 2008; 3 pages.

*Primary Examiner*—Bernarr E Gregory
(74) *Attorney, Agent, or Firm*—Guerin & Rodriguez, LLP; William G. Guerin

(57) ABSTRACT

Described are a method and a system for generating a short-term forecast of echo tops as defined by weather radar measurements. The method includes receiving echo tops images for different times. An echo tops growth rate and an echo tops maximum value are determined for pixels in one of the images and used to generate echo tops prediction values for an echo tops prediction image. For pixels in regions of the image determined to be subject to convective initiation but where convective weather does not exist, an echo tops initiation height and the echo tops maximum value are determined and used with a predicted precipitation value to generate an echo tops prediction value for each pixel.

26 Claims, 8 Drawing Sheets

U.S. PATENT DOCUMENTS

| | | | |
|---|---|---|---|
| 6,670,908 B2 * | 12/2003 | Wilson et al. | 342/26 R |
| 6,920,233 B2 | 7/2005 | Wolfson et al. | |
| 7,062,066 B2 * | 6/2006 | Wolfson et al. | 382/100 |
| 7,109,913 B1 * | 9/2006 | Paramore et al. | 342/26 B |
| 7,200,491 B1 * | 4/2007 | Rose et al. | 702/3 |
| 2002/0114517 A1 | 8/2002 | Wolfson et al. | |
| 2003/0025627 A1 * | 2/2003 | Wilson et al. | 342/26 R |
| 2003/0156734 A1 | 8/2003 | Wolfson et al. | |

* cited by examiner

WEATHER RADAR ECHO TOPS FORECAST GENERATION

RELATED APPLICATION

This application claims the benefit of the earlier filing date of U.S. Provisional Patent Application Ser. No. 60/695,590, filed Jun. 30, 2005, titled "Echo Tops 0-2 Hour Forecast," the entirety of which is incorporated herein by reference.

GOVERNMENT RIGHTS IN THE INVENTION

This invention was made with United States government support under Contract No. FA8721-05-C-0002 awarded by the Federal Aviation Administration. The government may have certain rights in the invention.

FIELD OF THE INVENTION

The invention relates generally to weather radar image processing and more particularly to generating short-term predictions of the location of radar echo tops associated with weather events.

BACKGROUND OF THE INVENTION

Air traffic congestion worldwide has increased significantly in recent years. The congestion often leads to air traffic inefficiencies, especially when weather along flight routes impacts normal flight schedules. These inefficiencies frequently include longer flight times and increased fuel consumption. Air traffic management personnel often make critical real-time decisions regarding whether to alter flight routes and schedule times based on weather events. The ability to predict the occurrence and location of convective weather events has proven to be particularly challenging.

High resolution precipitation forecasts have been employed to assist in air traffic management. For example, rapidly updated precipitation forecasts (e.g., forecasts issued in 5 to 6 minute intervals) extending out to two hours have been used. However, precipitation forecasts are not always adequate for determining available en route airspace. Significant precipitation sometimes occurs in regions where the cloud tops associated with the storms are moderately low (e.g., less than 30 kft). In such instances, reliance on a precipitation forecast alone can result in significant changes to flight routes to avoid the precipitation regions even though the associated cloud tops are sufficiently low for aircraft to safely fly above the weather.

SUMMARY OF THE INVENTION

In one aspect, the invention features a method for generating a short-term forecast of echo tops. A plurality of echo tops images each generated for a different time is received. An echo tops growth rate for a pixel in one of the echo tops images is determined in response to a value of the pixel in the respective echo tops image and a value of a respective pixel in at least one of the other echo tops images. An echo tops maximum value for the pixel is also determined. An echo tops predicted value for the pixel is generated in response to the one of the echo tops images, the echo tops growth rate and the echo tops maximum value.

In another aspect, the invention features a method for generating a short-term forecast of echo tops. An echo tops image is received, and an echo tops initiation height and an echo tops maximum value are determined for a pixel in a convective initiation region of the echo tops image. An echo tops predicted value for the pixel is generated in response to the echo tops initiation height, the echo tops maximum value and a predicted precipitation value.

In another aspect, the invention features a system for generating a short-term forecast of echo tops. The system includes an echo tops image processor, a tracker module, an advection module in communication with the tracker module, and a forecast application module in communication with the echo tops image processor and the advection module. The echo tops image processor is configured to receive an echo tops image and to determine echo tops maximum values for the echo tops image. The tracker module receives a plurality of weather radar images and generates an array of tracking vectors in response to the weather radar images. The advection module is configured to receive the weather radar images and applies the array of tracking vectors to one of the weather radar images to generate a weather radar prediction image. The forecast application module generates an echo tops prediction image in response to the weather radar prediction image, the echo tops image and the echo tops maximum values.

In yet another aspect, the invention features a method of providing weather radar data and echo tops data to a user. A weather radar prediction image is determined in response to a plurality of weather radar images. Each weather radar image is representative of a value of a meteorological parameter at a geographical location at a different time. An echo tops prediction image is determined in response to a plurality of echo tops images. A combined prediction image is generated by replacing the value of the meteorological parameter for a pixel in the weather radar prediction image with a value of a respective pixel in the echo tops prediction image if the value of the meteorological parameter exceeds a threshold value.

In still another aspect the invention features a method of providing weather radar data and echo tops data to a user. According to the method, a combined prediction image is displayed. The combined prediction image indicates a value of a meteorological parameter as a function of location for a geographical area where the value of the meteorological parameter does not exceed a threshold value. Conversely, the combined prediction image indicates an echo tops value for each location where the value of the meteorological parameter exceeds the threshold value.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

Observations have shown that pilots while en route routinely fly over low echo top weather even in areas of moderate to heavy precipitation. In contrast, pilots generally avoid storms with the higher cloud tops (e.g., overshooting tops) due to their localized turbulence. Flight deviations and route blockage due to storms are common in terminal airspace where aircraft climb to cruising altitude but may not be able to fly over storm tops. The present invention relates to a method and system for generating a short-term forecast of echo tops for convective weather events. Advantageously, information about vertical storm structure provided in an echo tops forecast can assist pilots and air traffic management personnel in recognizing available traffic routes during convective weather events. Notably, aircraft are not necessarily diverted around regions of significant predicted precipitation if the echo tops forecast indicates that the cloud tops associated with these regions are sufficiently low for safe flight over these regions.

Figure 1:
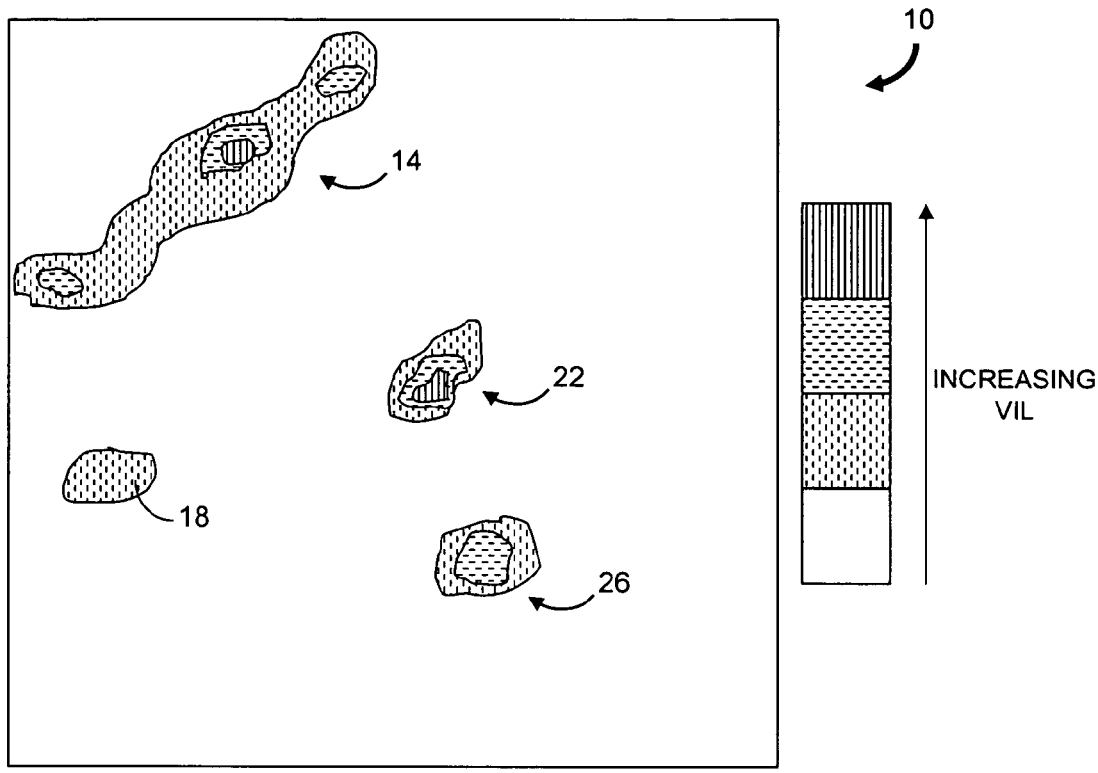
FIG. 1 illustrates a weather radar image showing precipitation ranges as a function of location in a geographical area.

FIG. 1 illustrates a weather radar image 10 for a certain geographical area. Data obtained using multiple radar sensors are combined as a mosaic image. Ranges of values of a meteorological parameter for different locations in the area are indicated by color as depicted by the key at the right of the image 10. In the illustrated image 10, the meteorological parameter is vertically integrated liquid water (VIL) although other types of weather radar images can depict a different meteorological parameter as a function of location in the geographical area. As used herein, the terms VIL and precipitation are used interchangeably; however, it should be recognized that VIL generally represents a particular quantification of precipitation. The illustrated weather radar image 10 includes several regions of precipitation, including precipitation associated with a line 14 of convection, a weak cell 18, and two intense cells (e.g., airmass storms) 22, 26.

Figure 2:
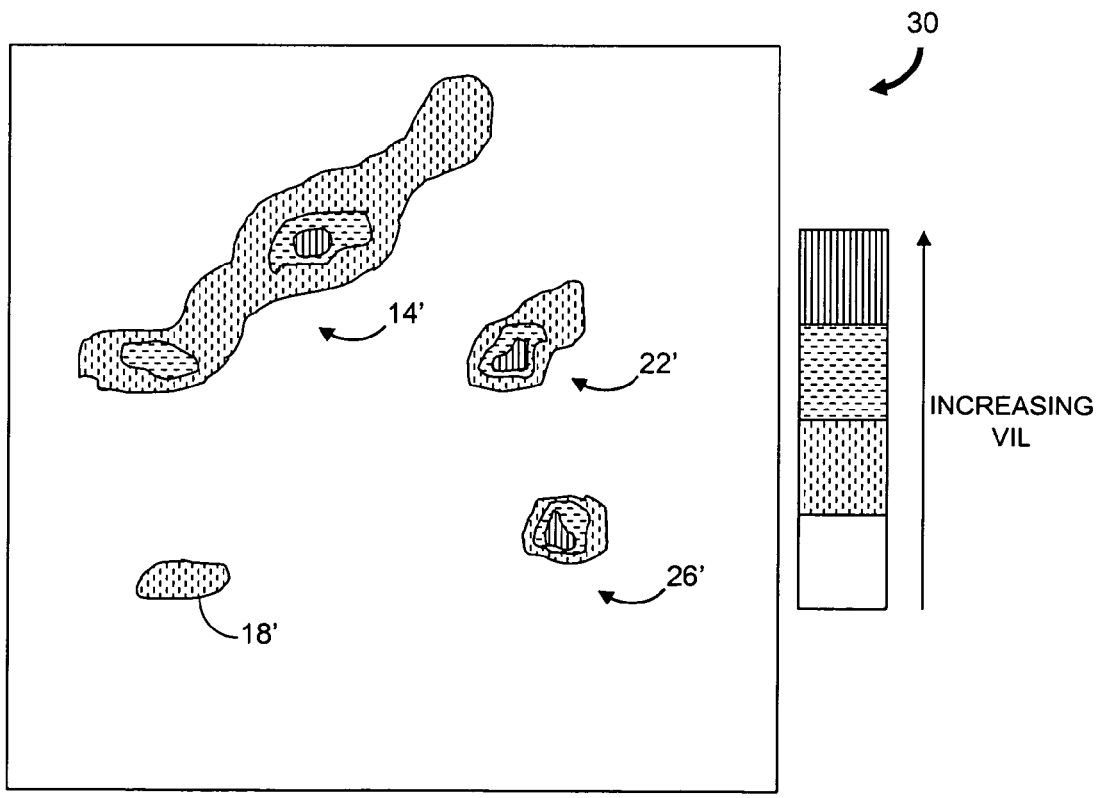
FIG. 2 illustrates a weather radar prediction image showing predicted precipitation ranges as a function of location in a geographical area at a certain forecast time.

FIG. 2 illustrates a weather radar prediction image 30 for the geographical area. The image 30 shows predicted precipitation intensity ranges as a function of location at a future (forecast) time. U.S. Pat. No. 5,959,567 titled "Method and Apparatus for Tracking of Organized Storms" and U.S. Pat. No. 6,920,233 titled "Method and Apparatus for Short-Term Prediction of Convective Weather" are incorporated by reference herein and disclose methods for generating a prediction image, such as the illustrated prediction image 30, from weather radar images, such as the weather radar image 10 of FIG. 1. U.S. patent application Ser. No. 10/144,667 titled "Method and Apparatus for Short-Term Prediction of Convective Weather" is incorporated by reference herein and discloses a method for generating a prediction image that is sensitive to the storm types present in the weather radar images used to generate the prediction image.

Features of interest present in the weather radar image 10 are indicated by corresponding primed references in the predicted image 30. Typically, the features exhibit increases (growth) or decreases (decay) in precipitation values. Preferably, the prediction image 30 is one of many images generated for different forecast times out to a maximum forecast time (e.g., 2 hours). A full set of prediction images can be displayed to a user as an image loop. Alternatively, a current weather radar image can be modified to include a contour of a predicted precipitation intensity level for one or more forecast times. Optionally, recent weather radar images (e.g., images obtained in a preceding hour) can be displayed prior to the prediction images to generate a longer image loop that includes both recent and predicted data. An image loop having recent and predicted images provides the user with an improved perception of the evolution of convective weather in the geographical area.

Figure 3:
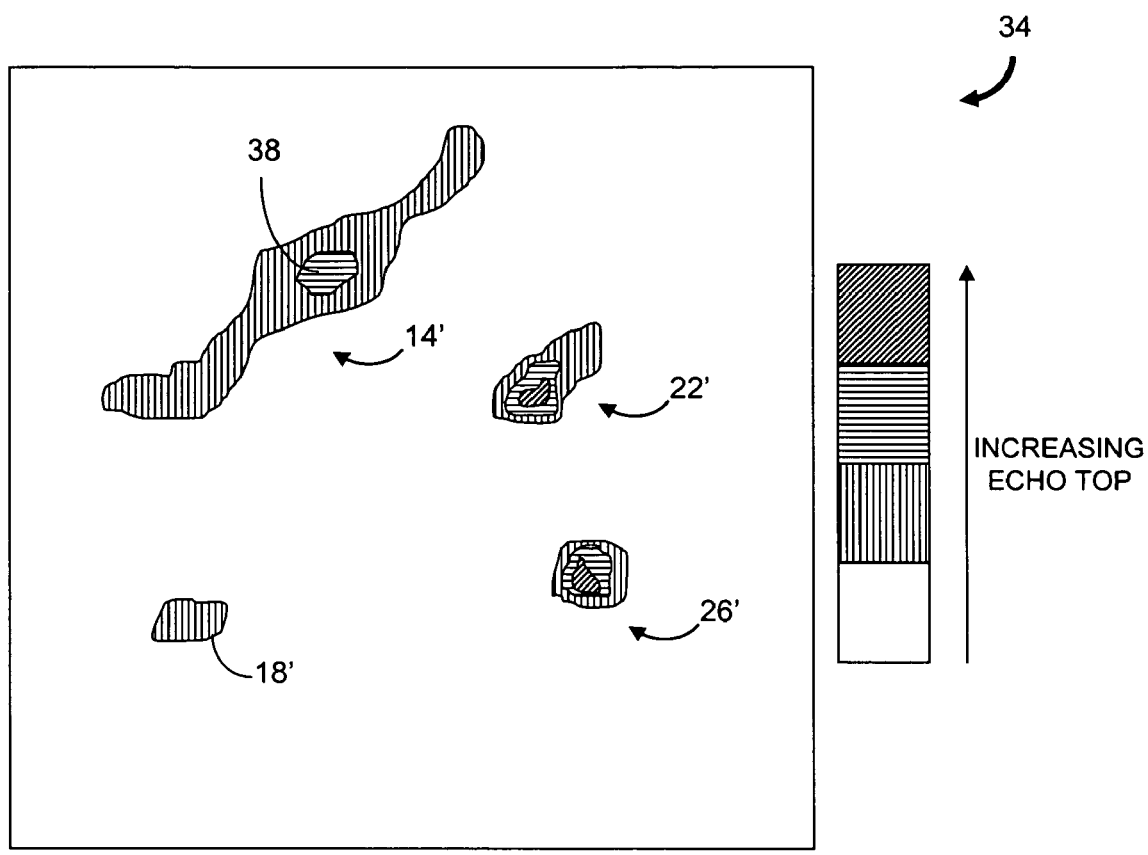
FIG. 3 illustrates an echo tops prediction image for the same forecast time as the weather radar prediction image of FIG. 2 in accordance with an embodiment of the invention.

FIG. 3 illustrates an echo tops (ET) prediction image 34 corresponding to the same prediction time as the weather radar prediction image 30 of FIG. 2. ET predicted values displayed in the ET prediction image 34 are obtained by determining the maximum altitude for which the signal strength of weather radar echoes received at one or more sensors in the geographical area exceed a predetermined value. In one embodiment, the predetermined value is 18 dBZ which is associated with the approximate altitude of visible cloud tops.

Referring again to FIG. 2, aircraft traveling from the upper left portion to the lower right portion of the image 30 may be diverted in order to avoid regions of significant precipitation in the convective line 14' and the large convective cells 22', 26'. Diversions can result in significant flight delays and increased fuel consumption.

The height difference between cloud tops associated with significant precipitation regions and flight altitudes sometimes exceeds an acceptable minimum difference (e.g., 5 kft) so that air traffic can pass safely over such regions. Referring again to FIG. 3, the echo tops displayed for the convective line 14' include only one small region 38 to be avoided. Consequently, when pilots and air traffic management personnel are provided with the ET prediction image 34, additional available airspace is recognized over much of the convective line storm 14' and flight path diversions can be reduced or eliminated. Aircraft would still avoid the two intense cells 22', 26' which have high cloud tops.

Figure 4:
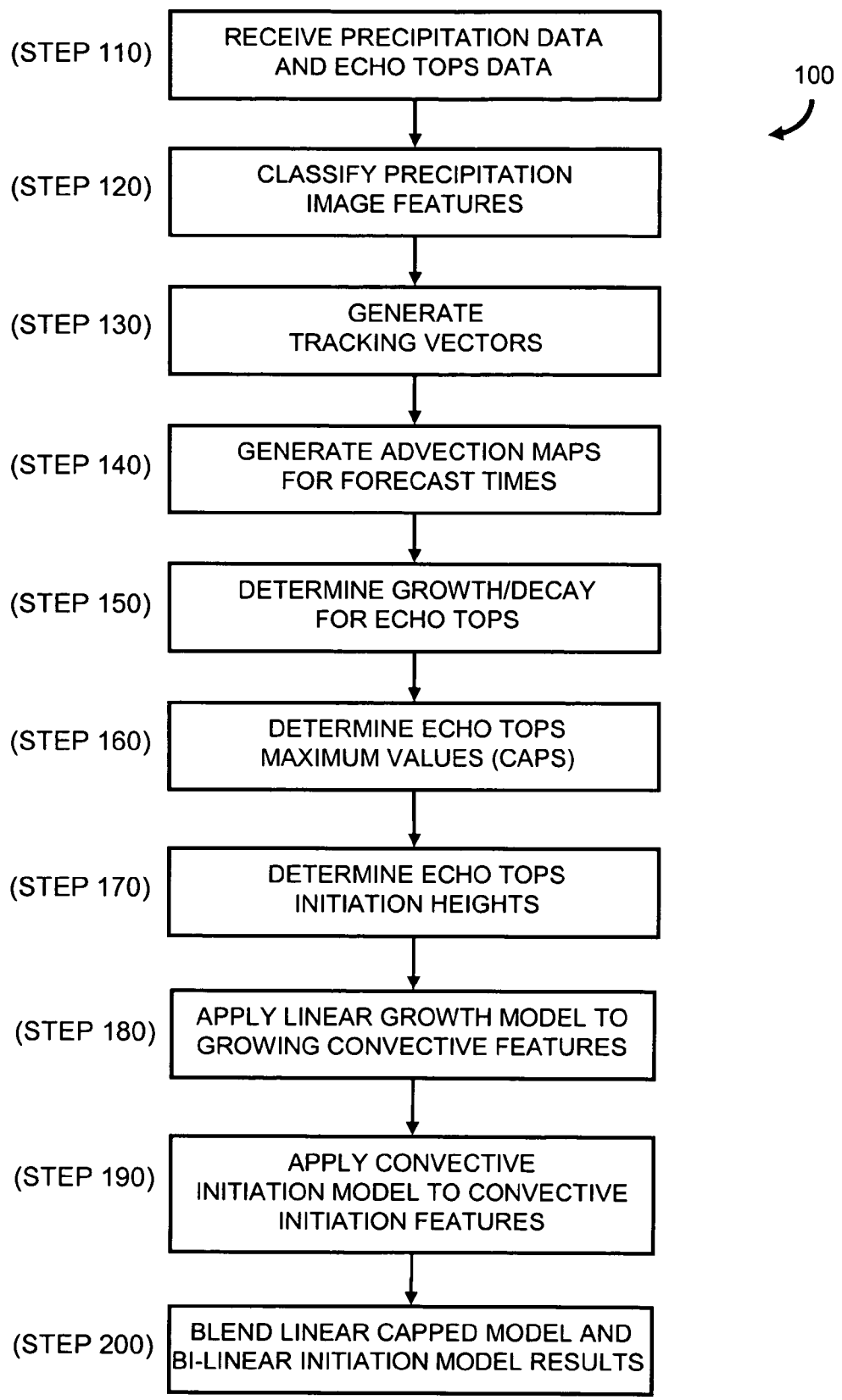
FIG. 4 is a flowchart representation of a method for generating an echo tops prediction image in accordance with an embodiment of the invention.

FIG. 4 is a flowchart representation of an embodiment of a method 100 for generating an ET prediction image according to the invention. High resolution precipitation data and ET data are obtained (step 110) from one or more weather radar sensors for a certain geographical area and are used to generate precipitation images and ET images. The generated images are used in subsequent processing and can be displayed to a user using one or more graphical displays.

Large scale weather features persist longer than small scale weather features. For example, supercells and multicellular clusters or lines persist longer than airmass cells. It is generally more difficult to predict where airmass cells will regenerate after collapse. In contrast, supercells and line storms typically grow new cells along preferred boundaries and produce new groupings of cells. Consequently, features in the precipitation images are classified (step 120) according to a weather type (e.g., convective, stratiform or other type). Each weather type can include subclassifications. For example, convective weather can be further classified as a line storm, a large cell storm or a small cell storm (e.g., airmass cell). Tracking vectors are generated (step 130) independently and combined (step 140) using the classified features into a single vector set (i.e., advection map). The vector set is used to advect features in the current or latest precipitation image (after any additional processing) to new locations in a precipitation prediction image. Features present in the current or latest ET image are advected using the same tracking vector set since the echo tops data and precipitation data are derived from the same radar sensors and have similar characteristics.

Similar to precipitation features, features in ET images typically grow or decay over time. Rates of growth and decay are determined by differencing previously obtained ET images according to a Lagrangian technique. For example, previous ET images are advected forward in time using the advection maps so that common features substantially overlap in a spatial sense for a common time. The images are differenced to determine (step 150) the growth or decay rates for pixels within the features. A spatial image filter can be applied to the difference image to smooth spurious difference values. The resulting values are used to extrapolate echo tops values for different forecast times.

Figure 5A:
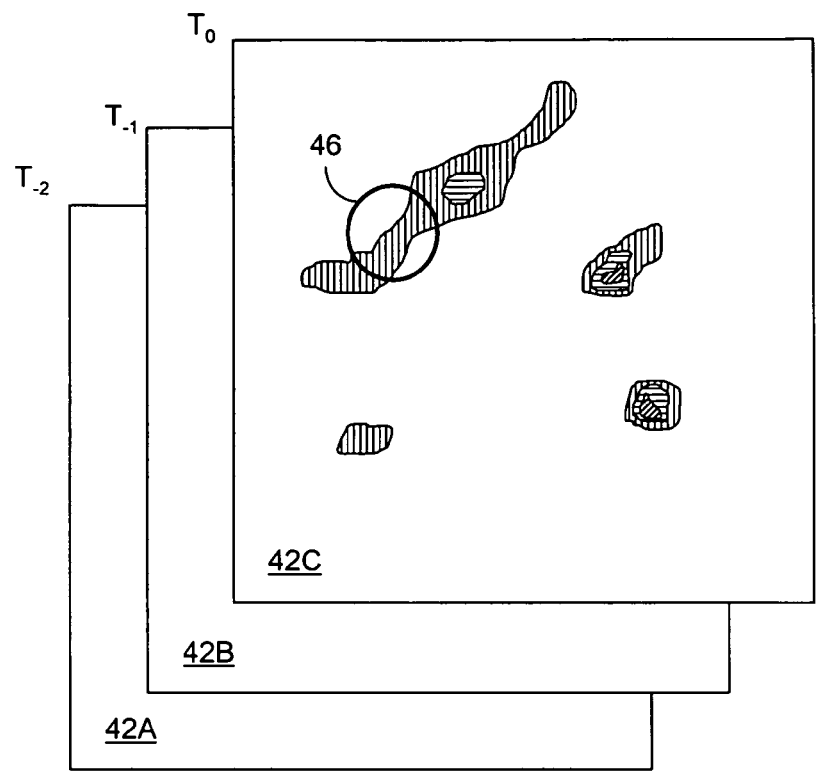
FIGS. 5A and 5B depict the processing of three consecutive echo tops images to obtain a distribution of echo tops values used to determine an echo tops maximum value in accordance with an embodiment of the invention.
Figure 5B:
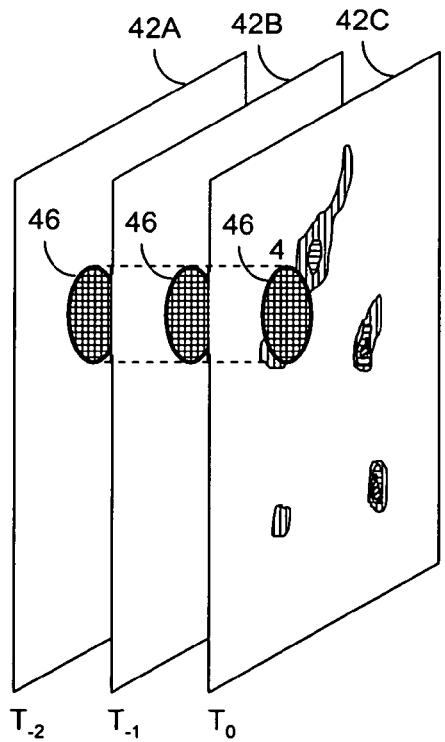
Figure 6:
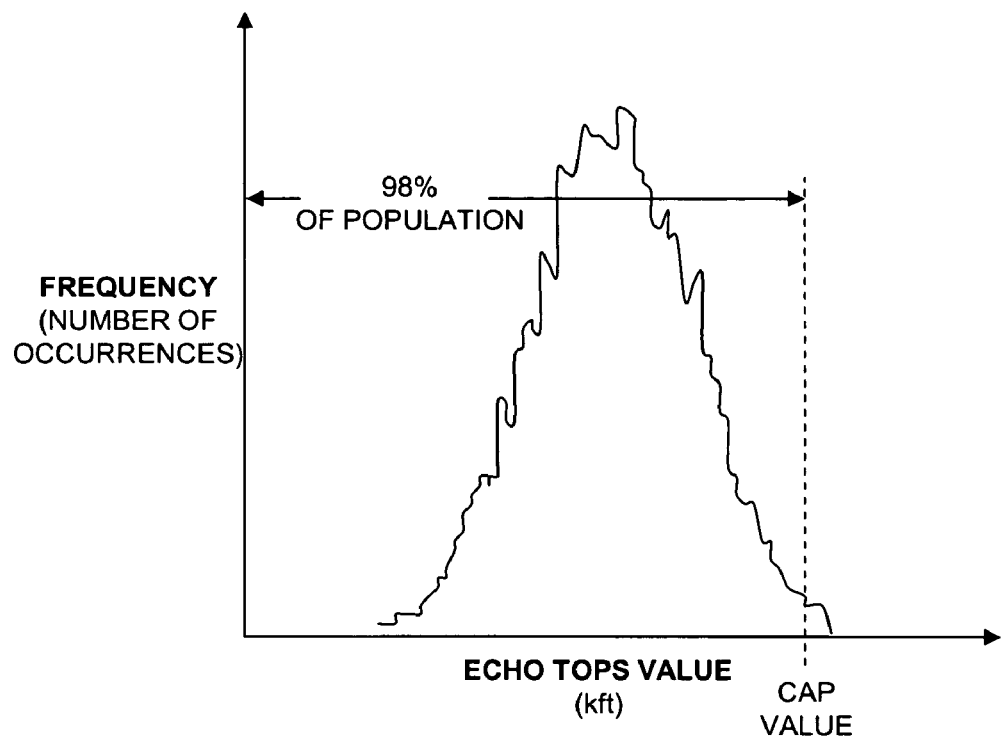
FIG. 6 shows a distribution of echo tops values obtained from the three echo tops images of FIGS. 5A and 5B for a single echo tops image pixel.

The statistics of previous storms within a region of interest are used to estimate (step 160) the ET maximum values (i.e., echo tops "caps") within the region at various forecast times. The estimated values are established by determining a distribution of echo tops values within a predefined image region surrounding each pixel. FIG. 5A shows three consecutive ET images 42A, 42B and 42C (generally 42) acquired for times $T_{-2}$, $T_{-1}$ and the most recent (or "current") time $T_0$, respectively. Consecutive images are separated in time, for example, by 5 minutes. Referring to FIG. 5B, a 51 km circular kernel 46 having a predetermined diameter (e.g., 51 km) is applied to the same pixel in each of the three ET images 42 to obtain a distribution of echo tops values (i.e., an echo tops histogram) as shown in FIG. 6. An echo tops value corresponding to a predetermined percentile in the distribution is determined and used as the ET maximum value for the pixel in an ET cap image. For example, the $98^{th}$ percentile of the distribution can be selected to achieve a conservatively high estimate of the ET maximum value. The ET cap image represents an estimate of the maximum values to which echo tops can increase according to an ET growth model. In various embodiments, the kernel size and percentile value are adjustable.

Other data such as an environmental height stability field can be used in combination with or in place of the historical echo tops values in the region of interest. In one embodiment, convective cloud top potential (CCTP) data available as a product of the Rapid Update Cycle (RUC) numerical weather prediction model from the National Oceanographic and Atmospheric Administration (NOAA)/National Centers for Environmental Prediction (NCEP) are used instead of the $98^{th}$ percentile values. CCTP data correspond to a height field that represents the maximum height a parcel of unstable air can reach in the atmosphere, i.e., the maximum height of the overshooting cloud top. In a preferred embodiment, the greater of the $98^{th}$ percentile value and the CCTP value for each pixel is selected as the ET maximum value for the pixel.

Convective weather can develop during the forecast interval in or near regions where little or no precipitation currently exists. Consequently, it is desirable to predict the initiation of convective weather and determine the echo tops for such weather at various forecast times. ET initiation heights for convective weather are determined (step 170) by determining the mode of the echo tops distribution for low level precipitation ranges and by determining the cloud heights for initiating proto-cells in regions determined to be susceptible to convective development. In one embodiment, the cloud heights are derived from satellite data. As used herein, a proto-cell is a cumulus cloud that will develop into a convective storm. The mode of the echo tops distribution and the proto-cell heights are combined for the regions of initiation to determine the ET initiation heights. In one embodiment, combination includes selecting the greater of the mode value and the proto-cell height value of each pixel as the ET initiation height for the pixel.

Figure 7:
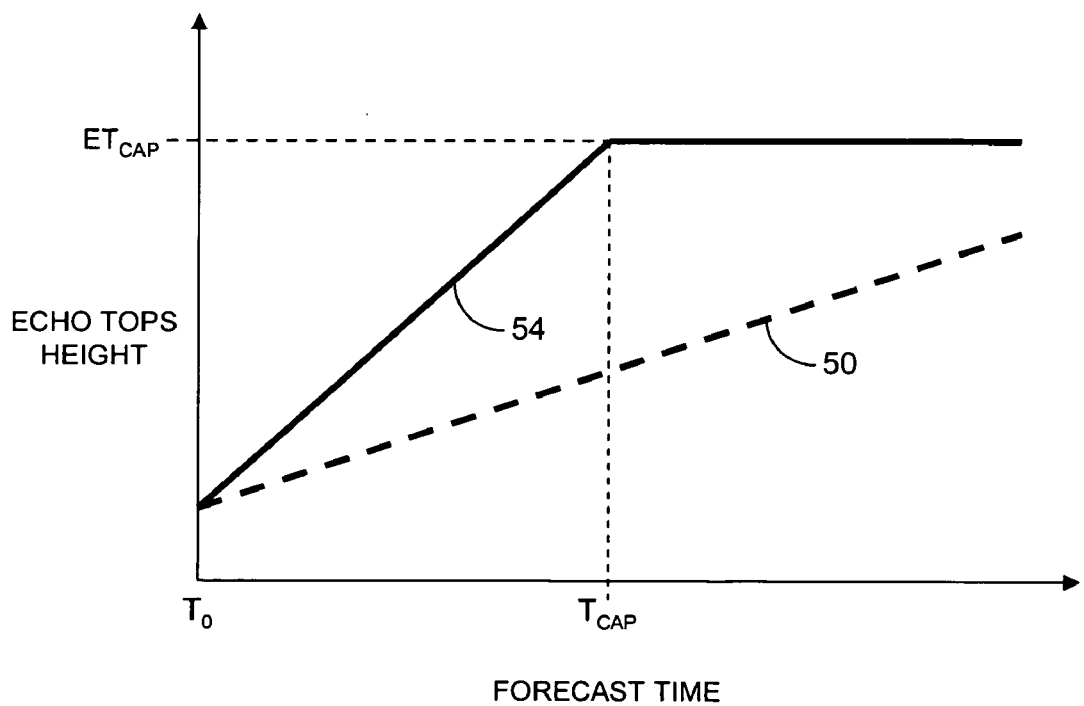
FIG. 7 graphically depicts a linear growth model used to generate echo tops predicted values in echo tops prediction images in accordance with an embodiment of the invention.

ET prediction images can be generated using two distinct models: a linear growth model and a convective initiation model. According to the ET linear growth model applied in step 180, echo tops determined to be growing in height are extrapolated to greater values as graphically represented in FIG. 7. In one example depicted by the dashed line 50, an echo tops value increases according to an echo tops growth rate (e.g., kft/minute) over the entire range of forecast times because the growth rate is not large enough for the echo tops value to increase to the corresponding echo tops cap value. In another example depicted by the solid line 54, an echo tops value increases with time to an ET maximum (cap) value $ET_{CAP}$ at a time $T_{CAP}$ and remains constant at the ET maximum value $ET_{CAP}$ for later forecast times. In the two graphical examples the ET maximum value is the same value $ET_{CAP}$; however, it should be realized that the ET maximum value generally varies among pixels in the ET image. For non-convective activity, echo tops are advected as part of the generation of the ET prediction images but growth and decay trends are ignored. In an optional subsequent method step, a median filter (e.g., 5 km×5 km) is applied to smooth the ET prediction image.

The ET convective initiation model is applied in step 190 to features determined to be subject to convective initiation. According to this heuristic model, the growth of initiating convective cells can be determined according to the forecast precipitation (VIL) value and a bi-linear "growth function." The convective initiation model includes a family of bi-linear growth functions. A particular growth function used to determine future growth is identified for each pixel according to an ET initiation level.

Figure 8:
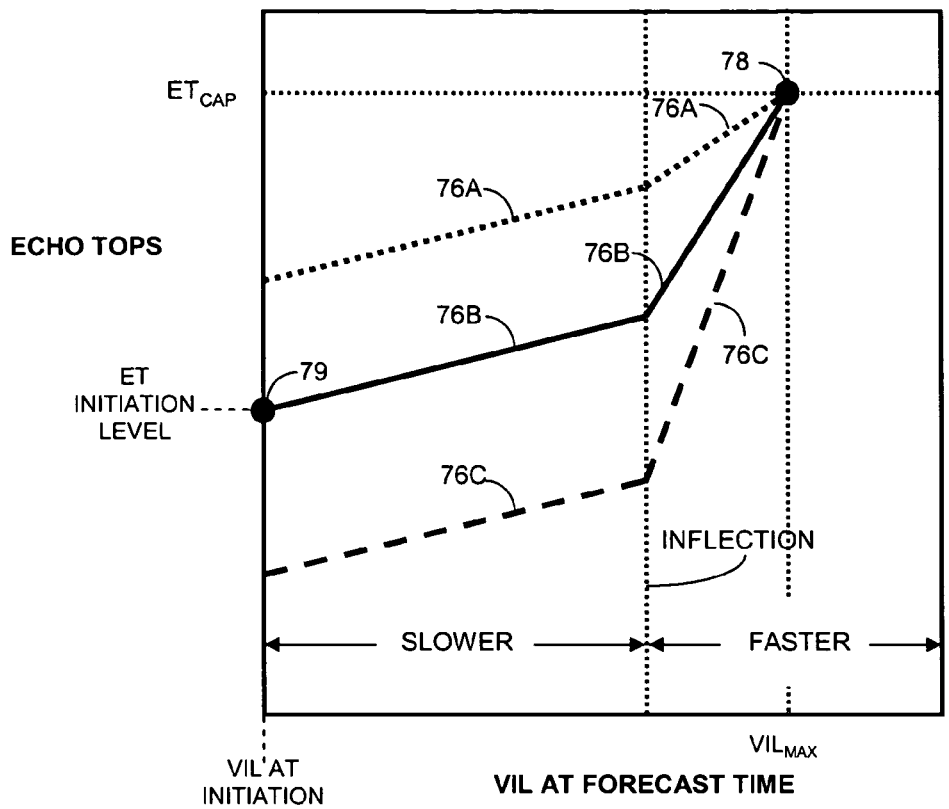
FIG. 8 graphically depicts a convective initiation model used to generate echo tops predicted values in echo tops prediction images in accordance with an embodiment of the invention.

FIG. 8 graphically depicts three examples of growth functions 76A, 76B and 76C (generally 76) from a family of bi-linear growth functions. Each growth function 76 includes a first linear portion at lower precipitation values that has a lesser slope than the slope of a second linear portion at higher precipitation values. In one embodiment, the precipitation value corresponding to the inflection point between the two linear portions for the growth functions 76 can be varied. The ET maximum value is shown by the line labeled $ET_{CAP}$. The maximum precipitation value $VIL_{MAX}$ that the atmosphere can support is used to define the upper "anchor" point 78 along the $ET_{CAP}$ line at which all growth functions 76 terminate. For a pixel in an ET prediction image, the particular growth function 76 used by the model is determined from the ET initiation level for the pixel. In the illustrated example, initiation point 79 lies on growth function 76B therefore ET predicted values generated by the convective initiation model are found from points along the two linear portions of the growth function 76B that have the predicted precipitation values for the forecast times.

ET predicted values generated by application of the linear growth model and the convective initiation model are blended (step 200) to generate a single ET prediction image. In one embodiment, blending includes determining for each pixel the greater of the two ET predicted values provided by the models.

Figure 9:
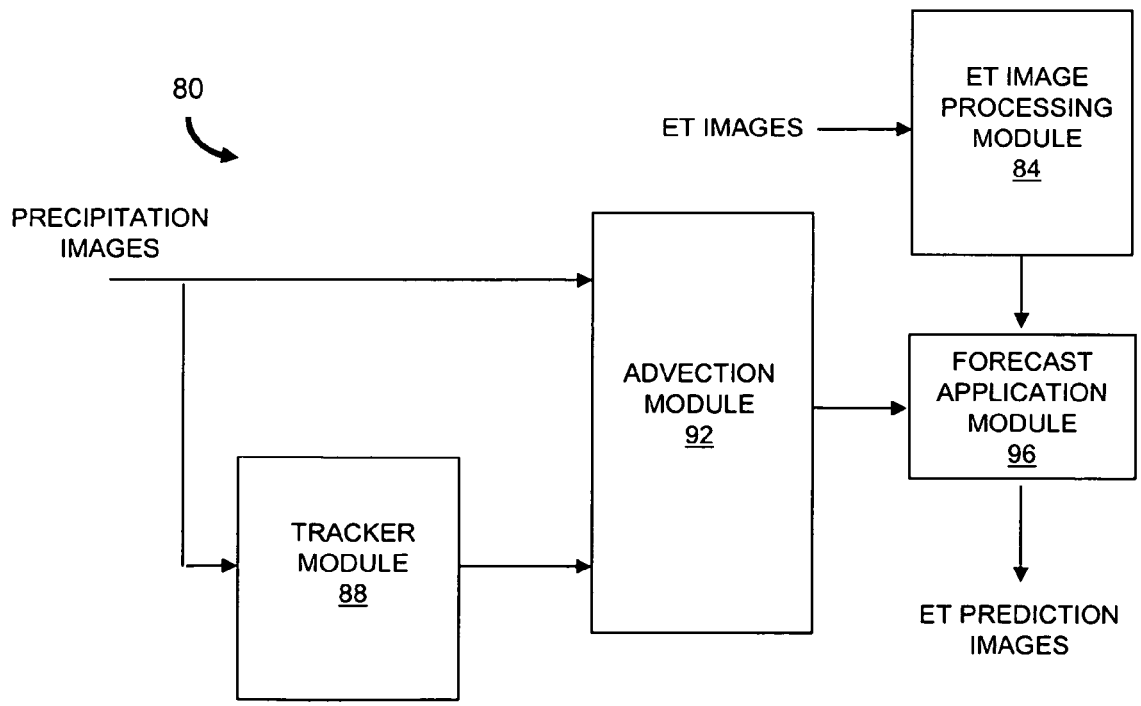
FIG. 9 illustrates a block diagram of a system for generating a short-term forecast of echo tops in accordance with an embodiment of the invention.

The method 100 can be implemented using any of a variety of processor and software modules. For example, a system 80 for generating a short-term forecast of echo tops according to an embodiment of the invention is shown in the block diagram of FIG. 9. The system 80 includes an ET image processing module 84 to calculate echo tops maximum values based on received ET images. In one embodiment, the ET image processing module 84 uses received CCTP data to determine the echo tops maximum values. A tracker module 88 processes received precipitation images (or other weather radar images) to generate tracking vectors. An advection module 92 uses the tracking vectors to advect the precipitation images for different forecast times. A forecast application module 96 applies the ET linear growth model and the ET convective initiation model to the ET images after advection of the precipitation image is completed, and combines the results of these two models as described above. In other embodiments not shown, the forecast application module receives other types of numerical weather prediction products in addition to or in place of the precipitation predictions to improve the ET predictions.

Figure 10:
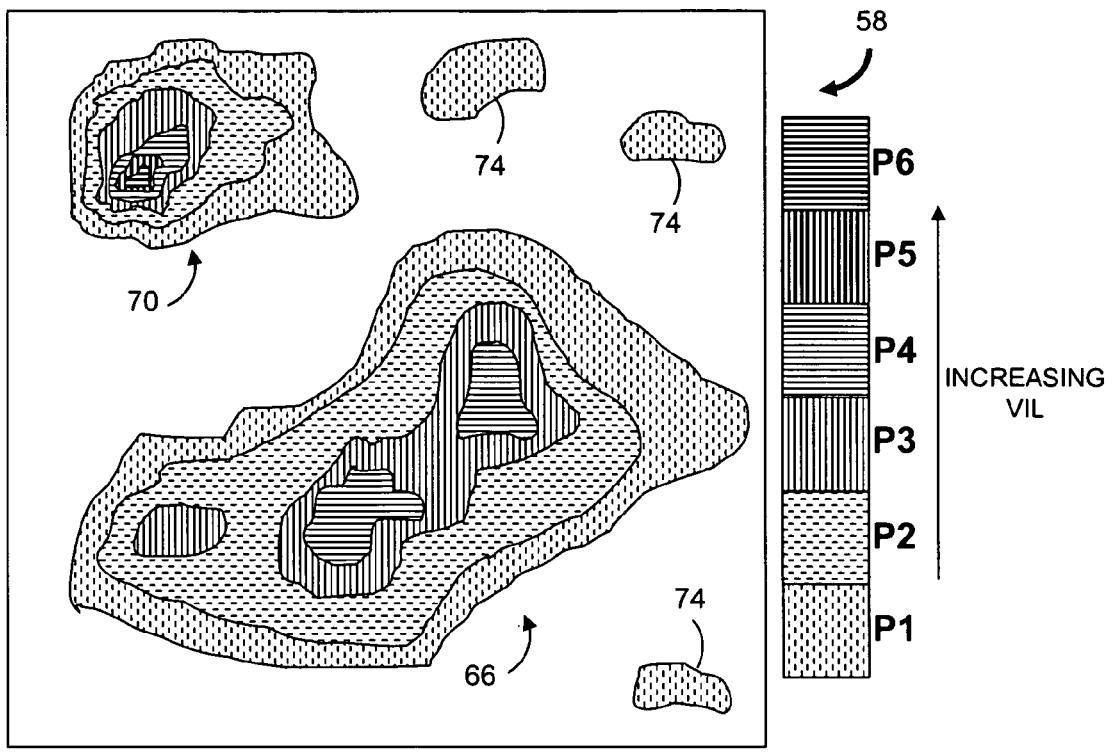
FIG. 10 illustrates a precipitation prediction image.
Figure 11:
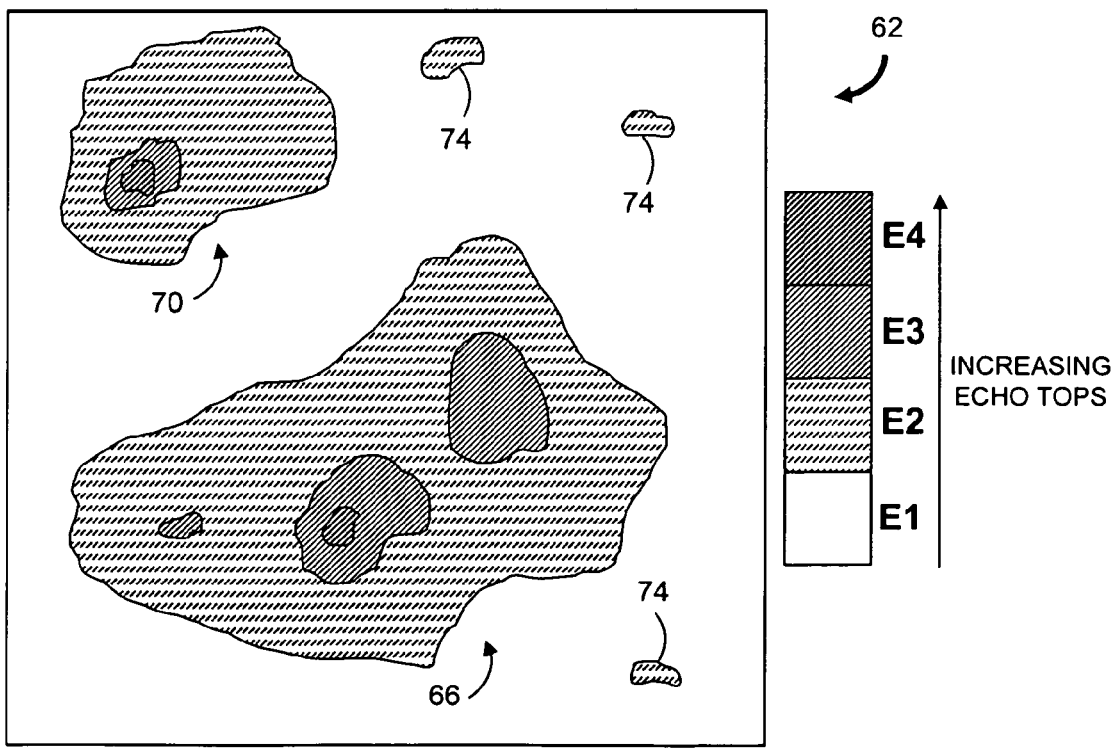
FIG. 11 illustrates an echo tops prediction image in accordance with an embodiment of the invention.

Preferably precipitation prediction images and ET prediction images are displayed to a user in an easily interpretable display format. Separate display windows can be used to display a precipitation prediction image 58 and an ET prediction image 62 as shown in FIGS. 10 and 11, respectively.

The precipitation prediction image 58 indicates ranges of precipitation (VIL) values according to a color key to the right of the image 58. In an alternative embodiment, the precipitation values are represented by intensity (e.g., grayscale). In the illustrated image 58, each color corresponds to a range of precipitation values and each range is referenced by a range reference index P1 to P6. Range P1 indicates the lightest precipitation range while range P6 indicates the greatest precipitation range. Two large-scale storms 66 and 70 are present in the image 58 and include regions having significant precipitation rates that extend up to range P4 and range P6, respectively. Other small-scale precipitation features 74 are shown having only a light precipitation range P1.

The ET prediction image 62 indicates echo tops as a function of location according to height ranges indexed as E1 to E4. For example, E1 through E4 can indicate ET height ranges up to 20 kft, greater than 20 kft to 30 kft, greater than 30 kft to 40 kft, and greater than 40 kft, respectively. Features in the ET prediction image 62 are indicated by the same reference number as the corresponding features in the precipitation prediction image 58.

The precipitation prediction image 58 can be interpreted to include hazardous zones in regions of higher precipitation rates (e.g., VIL values in ranges P3 to P6); however, as described above, these regions are not necessarily a hazard if the associated cloud tops are below certain heights. A user may have to repeatedly reference both prediction images 58, 62 in an attempt to determine whether such precipitation regions are available to air traffic above certain altitudes.

The present invention relates to a method and system for providing weather radar data and echo tops data to a user. Advantageously, the data are displayed to users such as pilots and air traffic management personnel in a convenient single image. Users can quickly determine whether high precipitation regions include cloud tops that should be avoided for flight safety without resorting to observation of multiple displays. Consequently the opportunities for confusion and mistake are significantly reduced and the response time for decisions on rerouting or delaying air traffic can be decreased.

Figure 12:
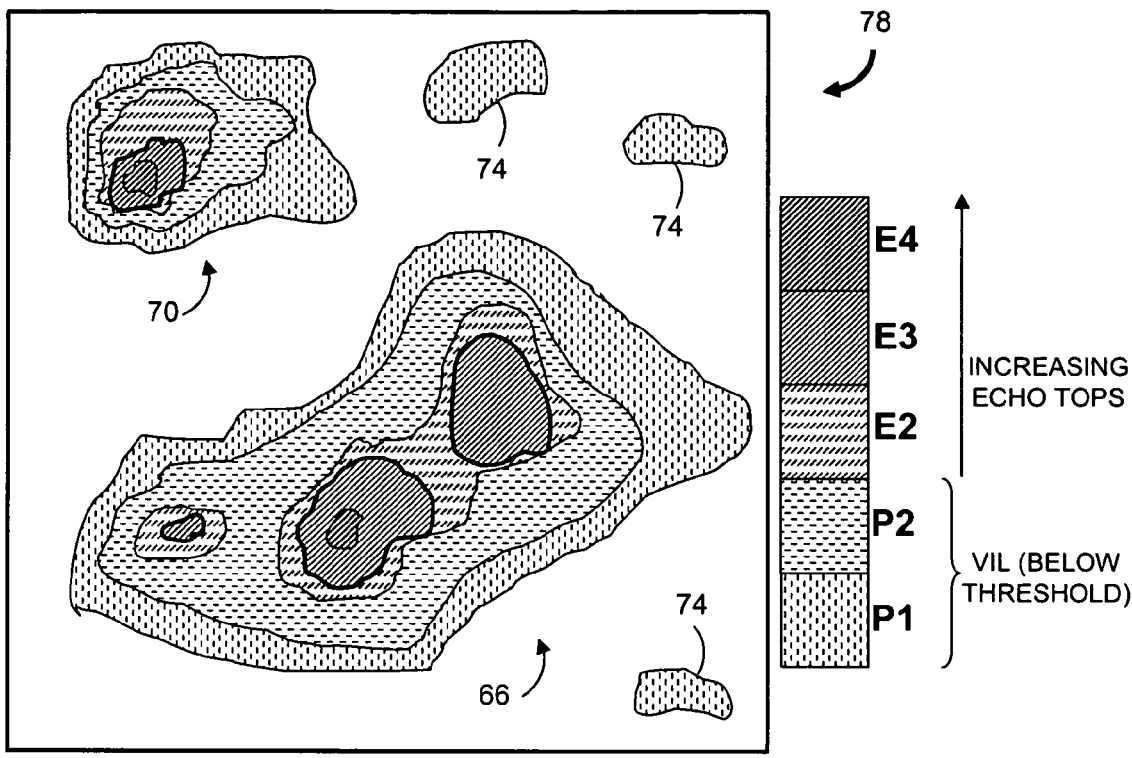
FIG. 12 illustrates a combined prediction image showing precipitation ranges and echo tops ranges in accordance with an embodiment of the invention.
Figure 13:
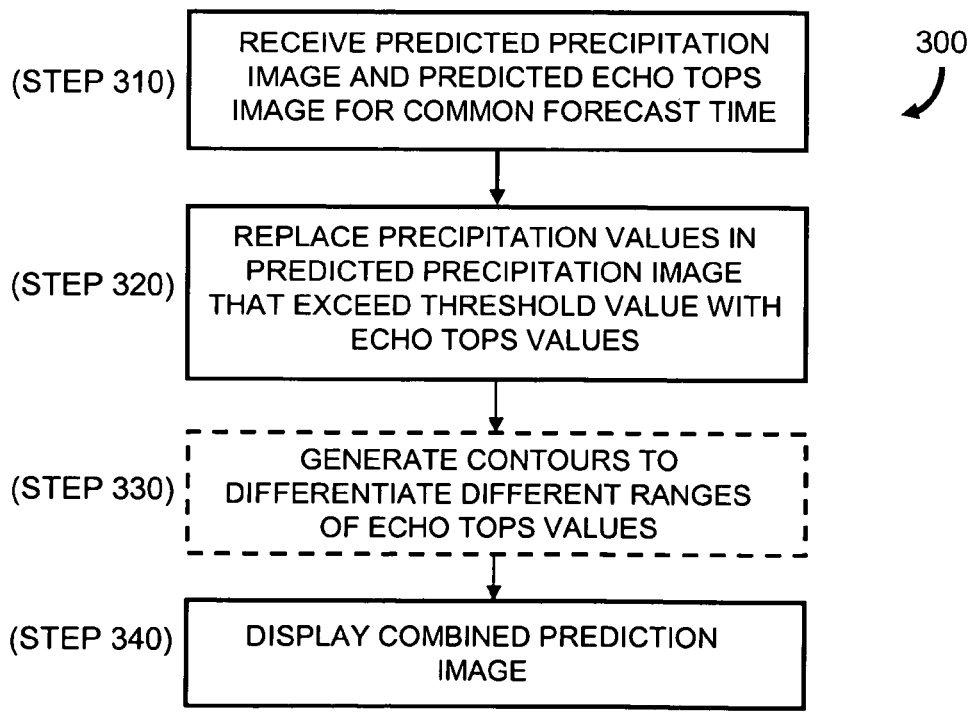
FIG. 13 is a flowchart representation of a method of providing weather radar data and echo tops data to a user according to an embodiment of the invention.

FIG. 12 illustrates an example of a combined prediction image 78 according to an embodiment of the invention. The combined prediction image 78 includes the features 66, 70, 74 in the precipitation prediction image 58 of FIG. 10 and the ET prediction image 62 of FIG. 11 in a manner in which echo tops display data are superimposed over precipitation display data. In particular, echo tops display data replace precipitation display data in regions where the precipitation display data exceeds a threshold value. In other embodiments, one or more other types of weather radar data are used in place of the precipitation data. FIG. 13 is a flowchart representation of a method 300 of providing weather radar data and echo tops data to a user according to an embodiment of the invention.

Referring to FIGS. 12 and 13, a predicted precipitation image and a predicted ET image are generated (step 310) using received weather radar data. Alternatively, the predicted precipitation image and predicted ET image are generated by a separate computational module and are received (step 310) for processing and display as the combined prediction image 78. The combined prediction image 78 includes the precipitation values in the predicted precipitation image; however, precipitation values that exceed the threshold value are replaced (step 320) with echo tops values from the corresponding locations in the ET prediction image. In the illustrated example, the threshold value is the maximum value for precipitation range P2. Optionally, the threshold value is programmable such that fewer or greater numbers of precipitation ranges are replaced with echo tops ranges.

The resulting image 78 is displayed (step 340) to a user as a single image using colors to represent precipitation ranges P1 and P2, and echo tops ranges E3 to E5. Optionally, contours (shown as bold lines) are generated (step 330) in the combined predicted image 78 to visually differentiate or distinguish image regions having echo tops values in predetermined "adjacent" ranges. In one embodiment, the contour is displayed as a colored line. As illustrated, the contours contrasts echo tops values in ranges E2 and E3.

Although the combined prediction image 78 is described above as a single image, it should be recognized that pairs of precipitation prediction images and ET prediction images can be processed according to the method 300. Each pair of images corresponds to a single forecast time. The resulting combined prediction images can be arranged in a looping image to display the time evolution of weather to the user over a range of forecast times (e.g., 2 hours). Optionally, historical precipitation images and historical ET images obtained over a recent time (e.g., a preceding hour) can be processed to generate combined historical images. A looping image can be generated that includes both the combined historical images and the combined prediction images. The extended time of such a looping image provides the user with an improved perception of the evolution of precipitation and cloud tops.

ET prediction images generated according to the invention can be provided to air traffic management facilities thus enabling improvements in route capacity and reroute efficiency for expected periods of adverse weather. The situational awareness resulting from the prediction of three-dimensional storm structure facilitates a rapid decision-making process that often requires coordination among multiple traffic management centers. Moreover, the combination of echo tops data and precipitation data in a single prediction image conveniently conveys critical information to users so that the need to reference and interpret multiple images is eliminated.

While the invention has been shown and described with reference to specific embodiments, it should be understood by those skilled in the art that various changes in form and detail may be made therein without departing from the spirit and scope of the invention.

What is claimed is:

1. A method for generating a short-term forecast of echo tops values for a weather radar measurement, the method comprising:
   (a) receiving a plurality of echo tops images each generated for a different time wherein each echo top image comprises a plurality of pixels, each pixel having an echo tops value derived from a weather radar measurement;
   (b) determining an echo tops growth rate for a pixel in one of the echo tops images in response to the echo tops value of the pixel in the respective echo tops image and the echo tops value of a respective pixel in at least one of the other echo tops images;
   (c) determining an echo tops maximum value for the pixel; and
   (d) generating an echo tops predicted value for the pixel in response to the one of the echo tops images, the echo tops growth rate and the echo tops maximum value.

2. The method of claim 1 wherein the determination of an echo tops maximum value is responsive to the echo tops value of the pixel and the echo tops values of the other pixels in a predefined image region surrounding the pixel for at least one of the echo tops images.

3. The method of claim 2 wherein the echo tops maximum value is determined by applying a predetermined percentile to a distribution of the echo tops values for the pixels in the predefined image region.

4. The method of claim 1 wherein the determination of an echo tops maximum value is determined from a convective cloud top potential for the pixel.

5. The method of claim 1 wherein steps (b), (c) and (d) are performed for each of a plurality of pixels in the one of the echo tops images to generate an echo tops prediction image.

6. The method of claim 5 wherein generation of an echo tops prediction image further comprises advecting the one of the echo tops images according to a plurality of tracking vectors.

7. The method of claim 6 wherein the tracking vectors are generated in response to a plurality of weather radar images.

8. The method of claim 7 wherein the weather radar images are precipitation images.

9. A method for generating a short-term forecast of echo tops values for a weather radar measurement, the method comprising:
   (a) receiving an echo tops image comprising a plurality of pixels, each pixel having an echo tops value derived from a weather radar measurement;
   (b) determining an echo tops initiation height for a pixel in a convective initiation region of the echo tops image;
   (c) determining an echo tops maximum value for the pixel; and
   (d) generating an echo tops prediction value for the pixel in response to the echo tops initiation height, the echo tops maximum value and a predicted precipitation value.

10. The method of claim 9 wherein the determination of an echo tops maximum value is responsive to the echo tops value of the pixel and the echo tops values of the other pixels in a predefined image region surrounding the pixel.

11. The method of claim 10 wherein the echo tops maximum value is determined by applying a predetermined percentile to a distribution of the echo tops values for the pixels in the predefined image region.

12. The method of claim 9 wherein the determination of an echo tops maximum value is determined from a convective cloud top potential for the pixel.

13. The method of claim 9 wherein steps (b), (c) and (d) are performed for each of a plurality of pixels in the one of the echo tops images to generate an echo tops prediction image.

14. The method of claim 13 wherein generation of an echo tops prediction image further comprises advecting the one of the echo tops images according to a plurality of tracking vectors.

15. The method of claim 14 wherein the tracking vectors are generated in response to a plurality of weather radar images.

16. The method of claim 15 wherein the weather radar images are precipitation images.

17. A system for generating a short-term forecast of echo tops values for a weather radar measurement comprising:
   an echo tops image processor configured to receive an echo tops image and to determine echo tops maximum values for the echo tops image, wherein each echo top image comprises a plurality of pixels, each pixel having an echo tops value derived from a weather radar measurement;
   a tracker module for receiving a plurality of weather radar images and generating an array of tracking vectors in response thereto;
   an advection module in communication with the tracker module and configured to receive the weather radar images, the advection module applying the array of tracking vectors to one of the weather radar images to generate a weather radar prediction image; and
   a forecast application module in communication with the echo tops image processor and the advection module, the forecast application module generating an echo tops prediction image in response to the weather radar prediction image, the echo tops image and the echo tops maximum values.

18. The system of claim 17 wherein the weather radar images are precipitation images.

19. A method of providing weather radar data and echo tops data to a user, the method comprising:
   determining a weather radar prediction image in response to a plurality of weather radar images, each weather radar image being generated for a different time and having a plurality of pixels, each pixel being representative of a value of a meteorological parameter at a geographical location;
   determining an echo tops prediction image in response to a plurality of echo tops images wherein each echo top image comprises a plurality of pixels and each pixel has an echo tops value derived from a weather radar measurement; and
   generating a combined prediction image by replacing the value of the meteorological parameter for a pixel in the weather radar prediction image with a value of a respective pixel in the echo tops prediction image if the value of the meteorological parameter exceeds a threshold value.

20. The method of claim 19 wherein the weather radar images comprise precipitation images.

21. The method of claim 19 wherein the value of a pixel in the weather radar prediction image indicates a range of values for the meteorological parameter.

22. The method of claim 19 wherein the value of a pixel in the echo tops prediction image indicates a range of echo tops values.

23. The method of claim 19 further comprising generating a contour in the combined prediction image to differentiate a region of pixels having echo tops values that exceed a predetermined value from pixels having echo tops values that do not exceed the predetermined value.

24. A method of providing weather radar data and echo tops data to a user in a combined prediction image having a plurality of pixels, the method comprising:
   determining, for a plurality of values of a meteorological parameter, if the value of the meteorological parameter exceeds a threshold value, each value of the meteorological parameter representing a location in a geographical area;
   for each pixel in the combined prediction image, displaying the pixel to represent the value of the respective meteorological parameter if the value of the meteorological parameter does not exceed the threshold value; and
   for each pixel in the combined prediction image, displaying the pixel to represent the value an echo tops prediction value if the value of the meteorological parameter exceeds the threshold value.

25. The method of claim 24 wherein the combined prediction image includes a contour differentiating two ranges of echo tops values.

26. The method of claim 24 wherein the meteorological parameter is a precipitation value.

\* \* \* \* \*